March 10, 1964 R. W. TACCONE 3,123,871
AUTOMATIC INSTALLATION FOR THE CONTINUOUS FABRICATION
OF SAND MOLDS AND CASTINGS
Filed April 25, 1961 12 Sheets-Sheet 1

Inventor
RUSSELL W. TACCONE
By Charles L. Lovercheck
Attorney

Inventor

RUSSELL W TACCONE

March 10, 1964

R. W. TACCONE 3,123,871

AUTOMATIC INSTALLATION FOR THE CONTINUOUS FABRICATION
OF SAND MOLDS AND CASTINGS

Filed April 25, 1961

Inventor

RUSSELL W. TACCONE

By

Charles L. Lombard

Attorney

March 10, 1964  R. W. TACCONE  3,123,871
AUTOMATIC INSTALLATION FOR THE CONTINUOUS FABRICATION
OF SAND MOLDS AND CASTINGS
Filed April 25, 1961  12 Sheets-Sheet 7

Inventor
RUSSELL W. TACCONE
By
Charles L. Lorenshed  Attorney

United States Patent Office 3,123,871
Patented Mar. 10, 1964

3,123,871
AUTOMATIC INSTALLATION FOR THE CONTINUOUS FABRICATION OF SAND MOLDS AND CASTINGS
Russell W. Taccone, Erie, Pa., assignor to Taccone Corporation, Erie, Pa., a corporation of Pennsylvania
Filed Apr. 25, 1961, Ser. No. 105,435
2 Claims. (Cl. 22—20)

This invention relates to apparatus for molding and, more particularly, to apparatus and systems for making molds for castings and the like.

An object of this invention is to provide an automatic installation permitting, successively, starting with the mold box, the making of the sand molds in the first stage, then the pouring of the molten metal into these molds, then cooling it, withdrawing the castings, and returning the empty mold boxes ready for the making of new molds.

Until now, it has never been possible to make an installation which was simple and completely automatic because of the enormous complications resulting from the fact that it was necessary to prevent any displacement or collapse of the mass of sand during the different stages of the handling of the half molds and complete molds.

The present invention permits, for the first time, an installation which is completely automatic, simple, of minimum overall dimensions, both surface area and height, without complex and costly mechanisms. This assures complete ease of handling from the time the empty boxes enter the molding machine until the return of the empty boxes after molding, casting, and punching out.

The installation according to the invention is notable in that the machine to fabricate the molds allows easy stripping without first turning over the complete mold box and pattern plate, before the stripping, whatever the form of the patterns. This also allows for easy handling during progressive movement along the conveyor line from the molding machine to the place for punching out the casting, without a bottom board, and without it being necessary to weight the molds.

The installation is also notable for the fact that the half molds which are suitably brought into position opposite one another are held at different levels before being assembled to form complete molds.

According to a particular characteristic of the invention, a double machine is utilized from which the half molds leave at the same level. Then, the lower half mold or drag is turned over and brought to a level below that of the upper half mold or cope. It is essential that, as soon as they leave the machine, the molds do not run the risk of collapsing, despite the absence of the bottom board to support them. The turning over of the drag can be made conveniently since the sand holds to it in the box without there being need to support it by a bottom board. In addition, the closing of the mold can be made very conveniently since the mass of sand in each of the two boxes holds perfectly by itself and, consequently, the bottom board does not make the operation difficult.

In one embodiment of the invention, the device for turning over the drag comprises a structure mounted in such a way as to be able to pivot around an axis parallel to the direction of travel of the conveyor line of the molds which leave the molding machine. The sand structure comprises, near its periphery, at least one compartment, the shape and size of which are determined by the parts for guiding the molds, placed in line with the path of circulation after leaving the molding machine, in such a way that when the two half molds leave the molding machine by the said path, the cope traverses the compartment of the pivoting structure for turning over the molds and continues its travel along a prolongation of the path.

At the same time, the drag, which follows the cope, is stopped in the said compartment and the structure then pivots by a half turn and, consequently, makes the drag descend and turns it over. Some means such as a cylinder is provided to make the drag leave the compartment which is then in its lower position and to bring it onto another track with rollers. The track is located below the track along which the cope left the turning over device, the cope having simply traversed this device.

According to another characteristic of the invention, the rolling track for the copes which is located on the level of the upper part of the turning over device and the rolling track for the drags, located on the lower level of the said device, run into a closing station for the molds. The closing station comprises, at its lower part, a reception platform for the drags, at the level of their arrival track, and a rig which is movable vertically. The rig is fitted with parts for the reception of the copes on the upper track and is capable of releasing the cope after having lowered it to the corresponding lower part, the mobile rig being able to re-ascend to its top position to receive a new cope.

In another embodiment of the invention, the complete circuit of the boxes and the molds has the form of an elongated rectangle while the boxes circulate permanently in the closed circuit successively along the four sides of the rectangle through the following stations: molding machine, closing station for the molds, pouring station, cooling area, punching out station, and return of the empty boxes to the molding machine.

In some embodiments, the rectangular circuit of the boxes and molds is located substantially in a horizontal plane whereas in other embodiments, it is located substantially in a vertical plane.

The invention will be better understood by reading the following description and by an examination of the accompanying drawings which show, by way of a non-limiting example, an embodiment of the invention.

Figure 1:
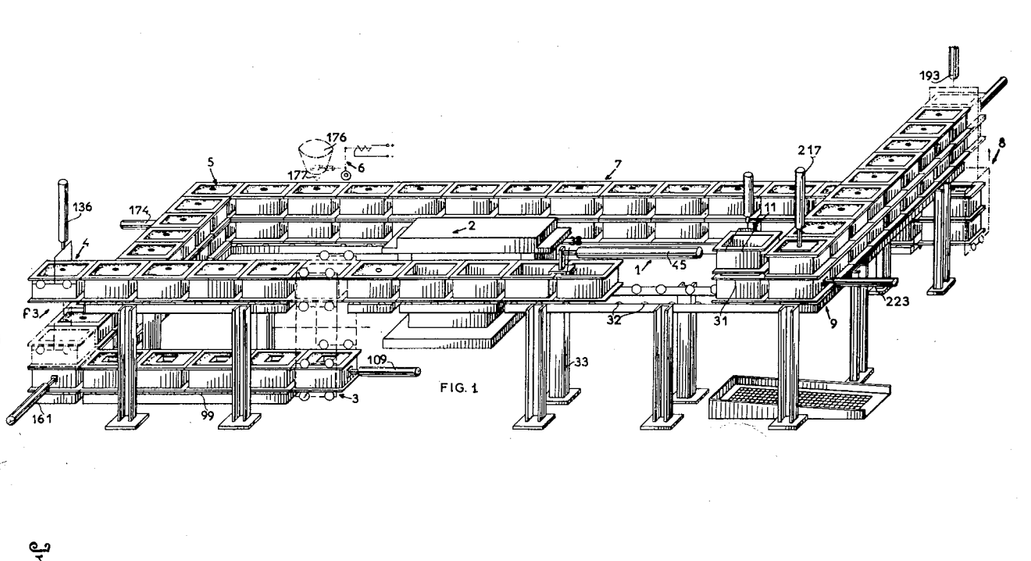
FIG. 1 represents diagrammatically, in perspective, the whole of an automatic installation for the continuous fabrication of sand molds and castings according to the invention.

Now with more specific reference to the drawings, the automatic installation for continuous fabrication of sand molds and castings is shown diagrammatically as a whole in FIG. 1. The installation comprises a closed circuit along which the mold boxes move continuously, sometimes empty and sometimes full with sand to form the molds in which the castings are made.

The circuit comprises a certain number of stations. An indexing station 1 brings the mold boxes, two by two, into a molding machine 2 and withdraws the molds from the machine 2. A station 3 for turning over the drags serves, at the same time, as a means of bringing them to a lower level than the copes, which follow their path at their level of leaving the molding machine. A closing station 4 is provided for the molds and, at the same time, for changing the direction, at right angles, of the path of the said molds. A station 5 is provided for simply changing the direction, at right angles, of the path of the molds.

A station 6 is provided for automatically pouring metal into the mold and a zone or area 7 is provided for cooling. A station 8 is for bringing the molds to a higher level and, at the same time, for changing direction by a right angle. A station 9 is provided for punching out of the molds and, at the same time, for changing direction by a right angle a last time. A station 11 is provided for taking hold of each cope again in order to replace it just behind the drag on which it had been previously positioned.

The whole of the installation has, in plan view, the form of a rectangular circuit of very elongated form with a right angle change of direction at each one of the corners. One of the long sides of the circuit is utilized for the punching out of the molds and for the preparation of the new molds while the other long side is for the pouring of the metal and the cooling. The two short sides are only intended for closing the circuit and their length is reduced to the minimum necessary, taking into account the size of the molding machine, which is placed between the two long sides of the circuit. The overall size of this installation is then reduced to the strict minimum, as well in surface area as in height.

The empty boxes arrive at the molding machine one behind the other and, on their exit from the molding machine, the drags are turned over and brought down to a slightly lower level, the copes afterwards being placed on the drags. The molds thus formed then travel along until they reach the station for pouring the metal and, from there to the cooling zone, on a horizontal plane which is approximately the level of the floor of the installation. For punching out, the molds are brought up again to the level of the molding machine in such a way that there is space for the castings and the sand to fall below the mold boxes while the empty boxes are ready to re-enter into the molding machine for the preparation of new molds.

During the whole of their circuit, the longitudinal axes of the mold boxes do not change directions. All changes of direction while travelling around the rectangle are made translationally and not with rotation. Thus, the mold boxes move lengthwise along the long sides of the rectangle of the circuit upstream and downstream of the molding machine, then to the stations for the pouring of the metal and for the cooling, while they move crosswise along the short sides of the rectangle of the circuit from the closing station for the molds to the position for the pouring of the metal and, from the elevating station, to the punching out station. Finally, the raising and lowering of the molds are again made without any rotational movement.

Figure 2:
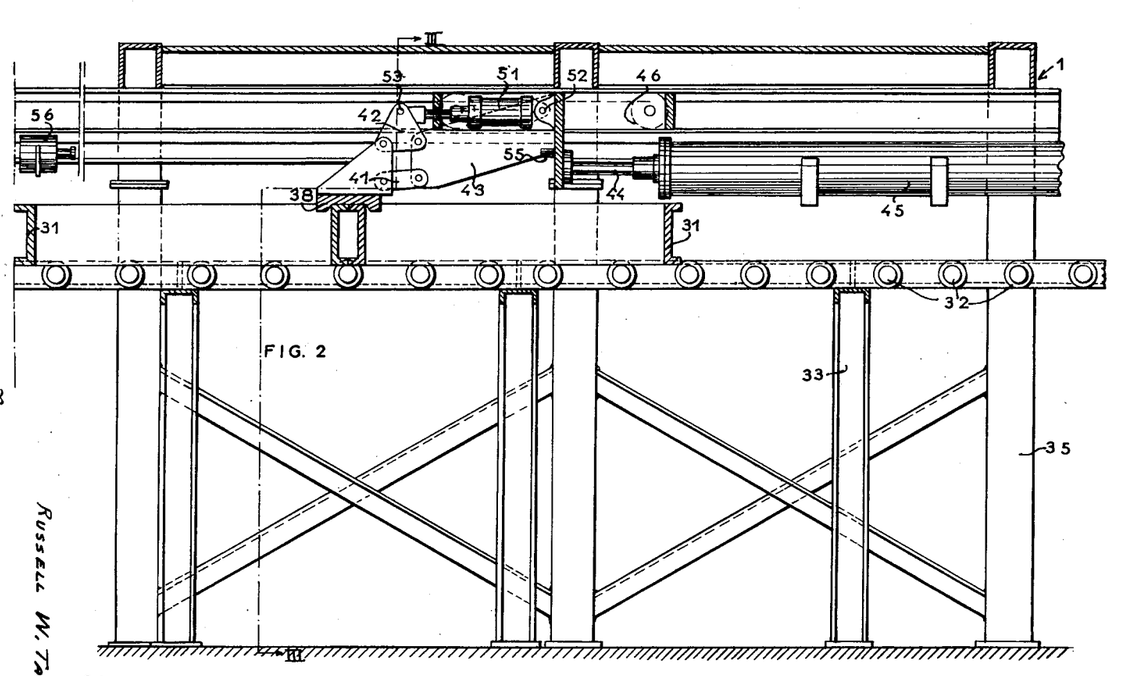
FIG. 2 is a front view, partly in section, of an indexing station serving as the means for bringing up the empty mold boxes into the molding machine.

Empty mold boxes 31 arrive at the indexing station 1, rolling along on the flat, one behind the other, on flanged rollers 32. This forms, for the lower edges of the long sides of the boxes, a horizontal track supported by a frame 33.

The indexing station 1, which causes the empty boxes to be brought up to the molding machine 2, comprises a frame 35 which forms a bridge above the track for the boxes formed by the rollers 32.

Figure 3:
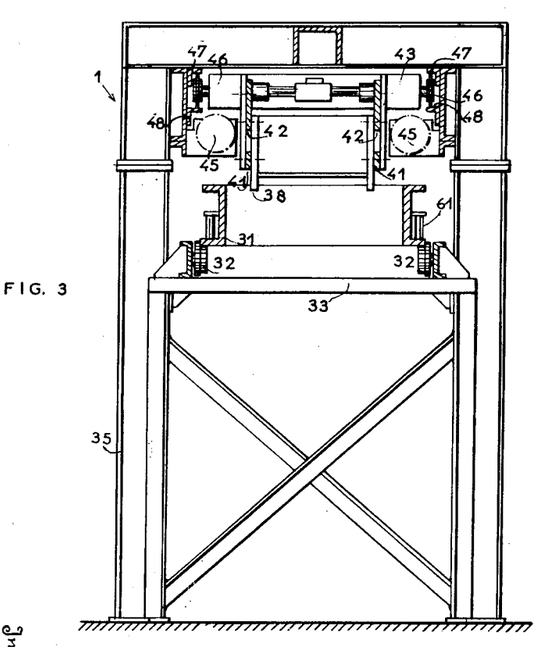
FIG. 3 is a vertical sectional view taken on line III—III of FIG. 2.

The mold boxes are advanced, two by two, end to end, on the rollers 32 by means of a type of clamp constituted by two shoes 38 of a section in the form of a reversed U. The shoes clamp onto the two upper adjacent rims of the short sides of two consecutive boxes 31. The shoes 38 are carried respectively by two devices forming articulated parallelograms, each one comprising two small links 41 and 42 of which one extremity is pivoted onto the corresponding shoe and the other extremity onto a support 43 rigid with the exterior extremity of a piston rod 44 of a horizontal cylinder 45. The axes of the cylinders 45 are parallel to the direction of the track for the mold boxes constituted by the rollers 32. Each support 43 is guided by a wheel which rolls along in the track formed by two angle pieces 47 and 48 rigid with the frame 35.

The supports 43 carry a small hydraulic cylinder 51. The cylinder proper is pivoted, at one of its extremities, around an axis 52 carried by the supports 43. The outside extremity of the piston rod of the cylinder 51 is pivotally connected by an axis 53 to a lateral boss of each one of the two upper links 42 supporting the shoes 38 in such a way that, when one actions the cylinder 51 in one direction or the other, one makes the shoes move up or down.

An abutment 55 which is rigid with the supports 43 enters into contact with a shock absorber device 56 which is rigid with the frame 35 at the corresponding end of travel of the cylinders 45.

The functioning of the indexing station is as follows:

The mold boxes 31 which arrive at the indexing station 1 under the action of means which will be described later are taken care of, two by two, in the following way:

The rods 44 being at their neutral positions, called "high," return the maximum amount inside the cylinders and the small cylinder 51 is actioned in the direction of its piston leaving the cylinder in order to make the two shoes 38 descend onto the two adjacent sides of the two mold boxes which are exactly at this position at that particular time. One actions the large cylinders 45 in such a way that the two mold boxes held by the shoes are brought into the molding machine 2. Then one actions the small cylinder 51 in the direction which produces the raising up of the shoes 38 which frees the two mold boxes. Finally, one brings back the large cylinders 45 into the position in which their piston rods 44 are back inside the cylinders. The two mold boxes are now disengaged and are free to be brought into the molding machine 2.

Each time that the large cylinders 45 bring two empty boxes into the molding machine, they push, at the same time, through the intermediary of these two mold boxes, two half molds which have just been made by the molding machine and which are thus driven to the station 3, the turning over station for the drags.

Figures 4, 5:
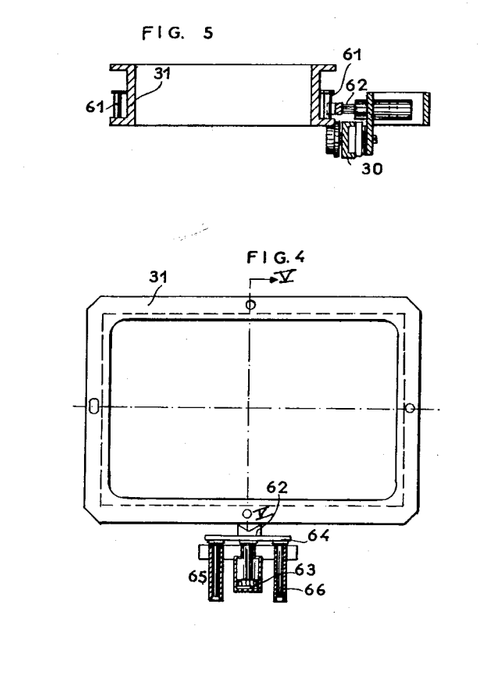
FIG. 4 is a plan view of a part of the station shown in FIG. 2 and shows the device for positioning the boxes longitudinally.
FIG. 5 is a cross sectional view taken on line V—V of FIG. 4.

In order to position the mold boxes with the required precision in the molding machine and, in fact, everywhere throughout the installation where it is felt that this is required, a positioning device is provided. The positioning device comprises a vertical spacer 61 of circular section, for example, on each mold box and held by the corresponding upper and lower edges of the box. A positioning part 62 is placed at a predetermined place along the rolling track of the mold boxes, the extremity of which is hollowed out in the form of a V in order to fit onto the spacer 61 of the box. The part 62 constitutes the piston rod of a small cylinder 63. The part 62 is rigid with a crosspiece 64 which carries two rods 65 which slide in two tubular guiding parts 66 fixed to the frame 33 for the rollers 32.

The mold boxes, brought approximately to their desired position by means of cylinders such as the cylinders 45 of the indexing station, are afterwards positioned with precision by the part 62 of which the V extremity fits onto the spacer 61 in order to center it better, should it be required, under the action of the small cylinder 63. The mold box which is rigid with the spacer is thus positioned with precision.

Figure 6:
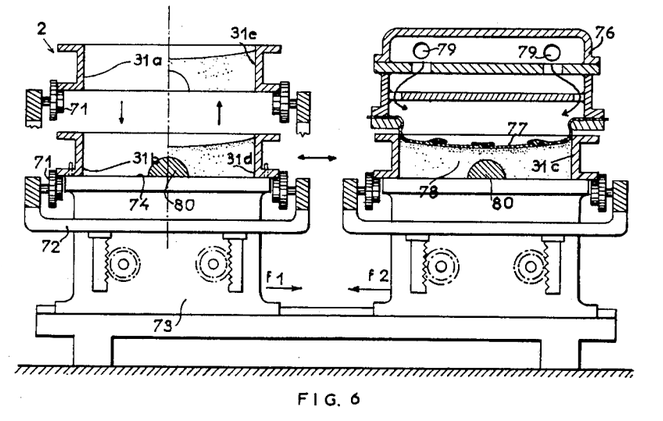
FIG. 6 shows diagrammatically, as a vertical cross section, the movement of the mold boxes for the making of the molds in the molding machine.

The actual molding machine is not part of the present invention and will not be described here in detail. An example will simply be given of the way in which the molds are made in the machine with a surface in the form of an arch as shown in FIG. 6. FIG. 6 represents, very diagrammatically, the different positions occupied by a mold box from the moment it comes empty into the machine to the moment when it leaves in the form of a mold.

Each mold box arrives in the molding machine in the position indicated at 31a at a certain level by rolling, for example, on rollers 71 mounted in a support 72 vertically movable on a stand 73. The stand 73 is movable horizontally, either backwards or forwards.

The support 72 descends to the point where the mold box occupies the position 31b. That is, it rests on a pattern plate 74 which is carried by the support 72 with a pattern 80. The frame afterwards is displaced backwards in the direction of an arrow f1 in such a way as to bring the whole assembly of the pattern plate 74 and the mold box into the active part of the molding machine. This comprises a part 76 which is in the form of a head and fitted with a very flexible, non-elastic diaphragm 77 of a large surface area. The diaphragm 77 is intended for effecting the packing down of the mass of sand 78 deposited in the mold box, after the pattern 80 has been placed on the pattern plate 74.

After the sand has been packed down by means of compressed air brought into the interior of the head through ports 79, the stand 73 moves in the forward direction as shown by an arrow f2. The box, having become a half mold, occupies the position 31d and then the support 72 is brought back to its higher position, in such a way that the half mold now occupies a position 31e. The stripping has been able to be made easily; that is, without turning over the whole assembly of the mold box, the pattern, and the pattern plate. This is due to the particular form of the mold which has a surface in the form of an arch, each point along the surface of which offers approximately the same resistance to the forces transmitted from the sand on the opposite face to the one where the impression is left by the pattern.

As from the moment when the half mold is raised up from the pattern plate and is supported, by its lower edge only, on the rollers 71, the mass of sand is only maintained in the interior of the box due to the formation of the mold, with its surface in the form of an arch, which prevents the collapse of the said mass of sand.

From this moment, the half molds, as well as the complete molds formed by a cope and a drag after they have been assembled, move along continuously on the rolling track while only bearing, by their rims, on the rollers which constitute the said tracks. This operation is only possible due to the particular structure of the mold in the form of an arch. The moving along of the molds on the rollers obviously gives rise to fairly large vibrations but these do not have any effect on the solidarity and resistance of the mold, again due to the structure of an arch offering an equal resistance over the whole of its surface, with the forces being transmitted to the edges, where the arch is supported.

The half molds are expelled from the molding machine by the empty mold boxes which are brought into the machine and arrive at station 3 for the turning over of the drags. This station comprises a rotating structure designated at 91 (FIGS. 7 and 8), which can pivot around a horizontal shaft 92 supported by two columns 93. This rotating structure is composed of four parallel beams 94 made rigid, in pairs, with the rotating shaft 92, by arms 95. Two of these beams are in a perpendicular plane to the shaft 92 close to one of its extremities, the other two beams being positioned close to the other extremity of the shaft. The beams 94 support eight cross bars 97 parallel to the axis of pivoting of the structure and on which are mounted flanged rollers 98 which are regularly spaced. The distance between the two cross bars located on the same side is such that the long side of a mold box 31 can roll freely between the rollers supported by these cross bars. Moreover, the length of these cross bars is approximately equal to the length of the mold boxes.

Figure 7:
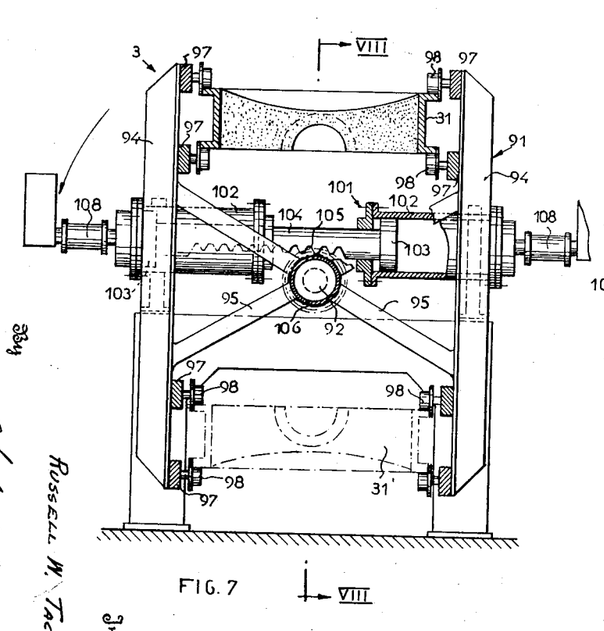
FIG. 7 is an end view partly in section of the station for the lowering and turning over of the drags.
Figure 8:
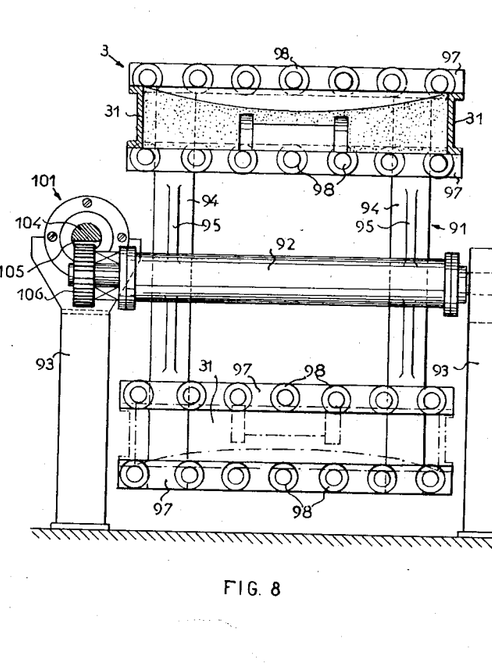
FIG. 8 is a cross sectional view taken on line VIII—VIII of FIG. 7.

The structure 91 can occupy one or the other of two stopping positions at one hundred eighty degrees to each other and, in both positions, the beams 94 are vertical. In each of these positions, the rows of rollers of four of the cross bars guide a mold box at the upper part of the structure and the rows of rollers of the four other cross bars guide another mold box at the lower part. In the part of the pivoting structure which is above, at a given moment, a half mold 31 rests on the rollers which are below it; that is, those of the two cross bars the closest to the axis of oscillation, while the half mold 31 which is in the lower part of the said structure rests, naturally, on the wheels fixed onto the cross bars which are the furtherest away from the axis.

The disposition of the whole assembly is such that the lower rolling track, of the two tracks which are in the upper part of the structure, at whatever moment, is always at the level of the rolling track constituted by the rollers 32 on which the molds roll on their exit from the molding machine and constituting, in some measure, a movable section of the rolling track. The axis of pivoting of the structure of the turning over station is parallel to the direction of this track.

Figure 9:
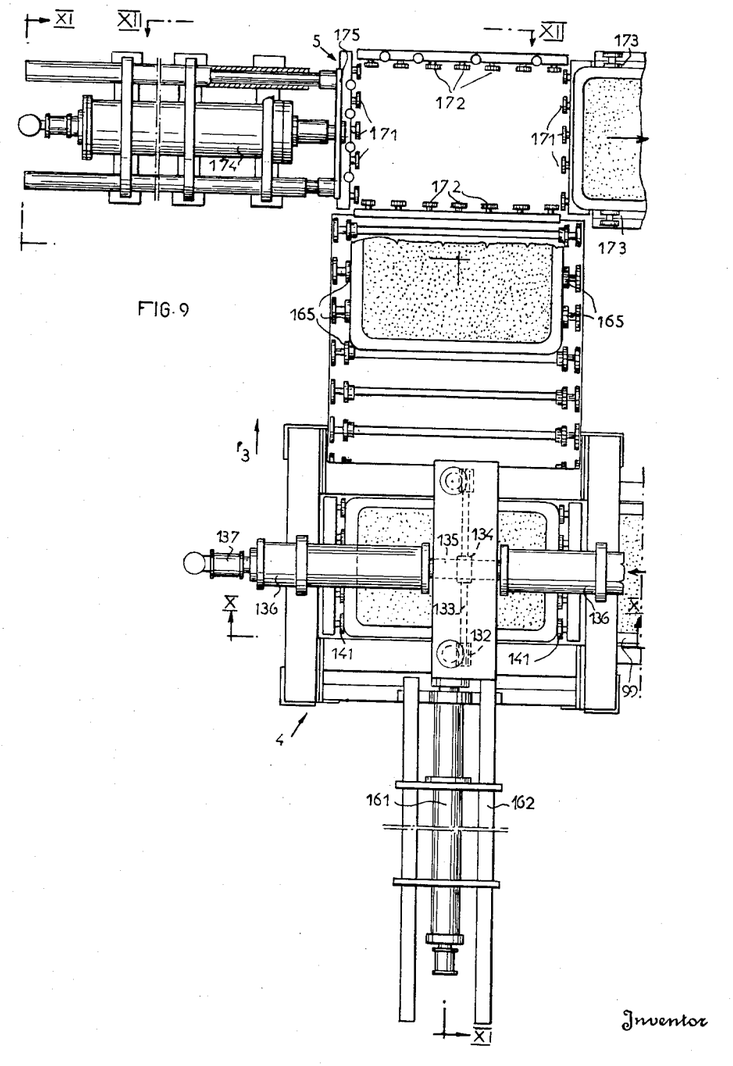
FIG. 9 is a plan view of the closing station for the molds and of the following station which is a station for changing of direction.
Figure 10:
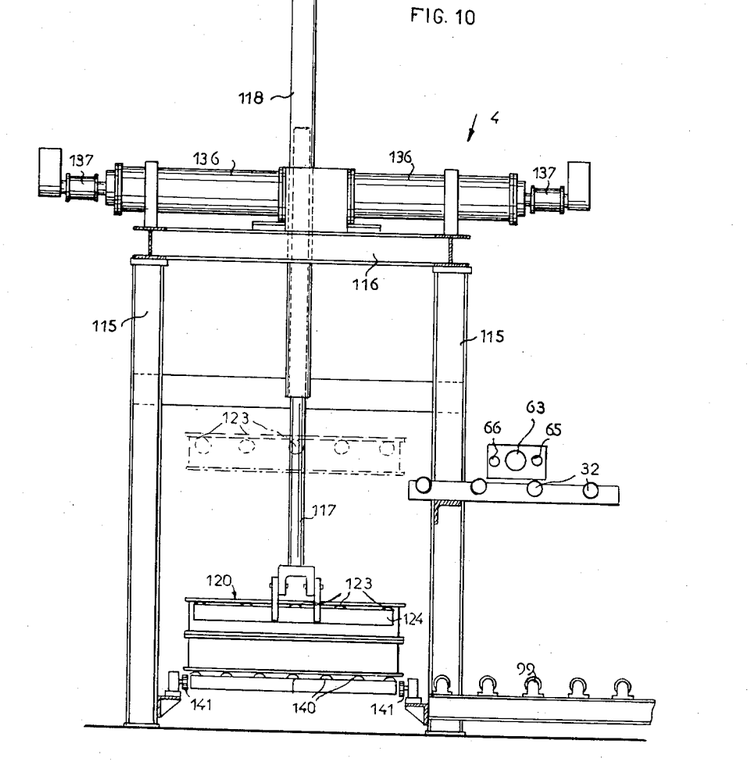
FIG. 10 is a vertical sectional view taken on line X—X of FIG. 9 of the closing station for the mold.

Moreover, at the level of the rolling track which is at the lower level of the pivoting structure 91 and as a prolongation of it, on the opposite side to the point of entry of the molds is a rolling track 99 (FIGS. 1, 9, and 10). The track 99 is intended for leading the drags from the turning over station 3 to the closing station 4 for the molds.

The movement of pivoting of the structure 91 is assured by a cylinder such as a double hydraulic cylinder 101 comprising two cylinders 102 in the interior of which are housed two pistons 103. The cylinders 102 are disposed coaxially with regard to each other and their common piston rod 104 is cut in the form of a toothed rack 105 in mesh with a toothed pinion 106 rigid with the rotating shaft 92.

According to how the fluid under pressure is admitted into one of the cylinders 102 or into the other, the toothed rack 105 is made to slide in one direction or the other. Consequently, a pivoting of the structure 91 is caused in one direction or the other. The travel of the pistons of the cylinders and the diameter of the toothed pinion are such that each time the pistons move from one end to another of the cylinders, the pivoting structure 91 makes a half turn, the end of the movement being brought to a halt by one or the other of two hydraulic dampers 108 fixed at the end of the two cylinders 102, respectively.

When the pistons are at one or the other of their ends of travel, the structure is vertical.

The evacuation of the drags from the lower part of the pivoting structure onto the rolling track 99 is assured by a pushing device integral with the movable element of a cylinder 109 (FIG. 1).

The functioning of the turning over device for the molds is as follows:

With each cycle of the molding machine, it evacuates, onto the rolling track, a cope followed immediately by a corresponding drag. The rolling track is thus filled with molds from the exit of the molding machine up to the entry to the turning over station 5 in such a way that, with each cycle, a cope traverses the turning over station without stopping there while a drag is stopped precisely in the part of the pivoting structure which is then in the upper position. The pivoting structure is made to execute a half turn while the forward movement of the molds is stopped. During this pivoting of a half turn of the structure 91, the drag, which is in the upper position then descends and, at the same time, is turned upside down. It is now at the level of the rolling track 99 of the exit from the turning over station onto which it is brought by the pushing device of the hydraulic cylinder 109.

This easily handled and very rapid turning over movement of the drags, without the aid of a pattern plate to avoid the caving in of the sand, is only rendered possible due to the considerable resistance of the molds with their faces in the form of an arch. The fact of being able to support and hold the molds solely by their rims makes the operation of turning over particularly easy.

The drags which are accumulated on the rolling track 99 advance, by the length of one mold, with each cycle of operation of the molding machine. Thus, they arrive at the lower part of the closing station 4 at the same time as the corresponding copes arrive at the upper part of the said station.

The closing station 4 of the molds (see also FIGS. 9 to 12) is thus fed, on the one hand, by the lower rolling track 99 on which the drags arrive lengthwise supported by their lower edges and, on the other end, by the upper rollers 32 on which the copes arrive, the lower surfaces of their edges rolling on the rollers and positioned in the plane of the joint of the mold. These rolling movements are always possible, without the mass of sand collapsing in the mold box, due to the special structure of the molds in the form of an arch.

Figure 11:
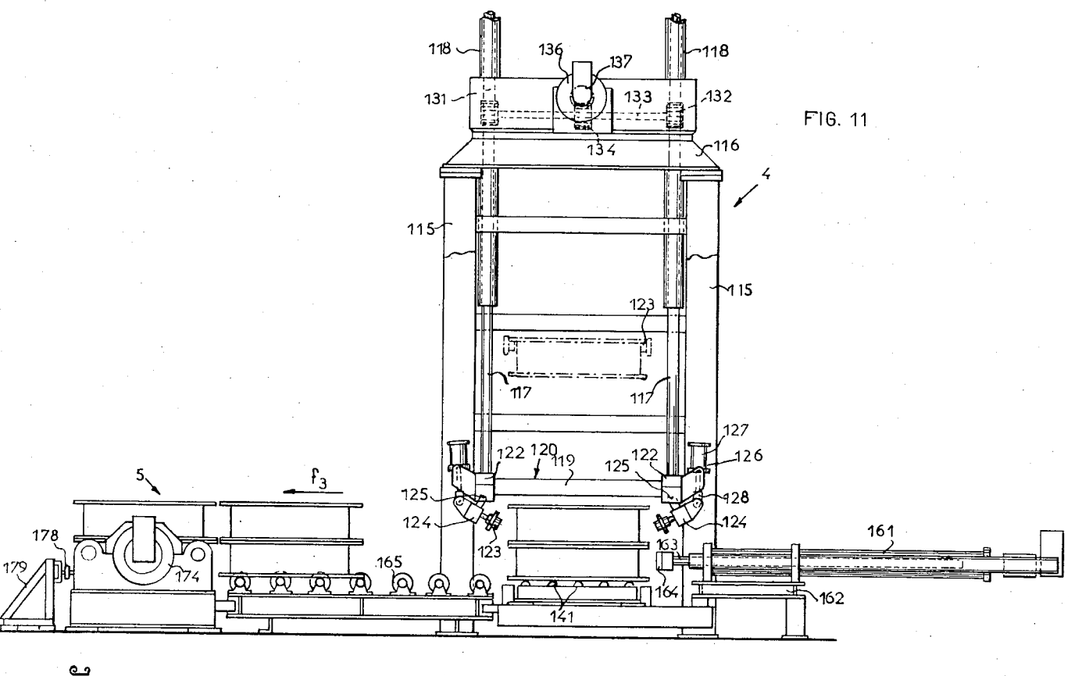
FIG. 11 is a vertical sectional view, perpendicular to FIG. 10, taken on line XI—XI of FIG. 9.
Figure 12:
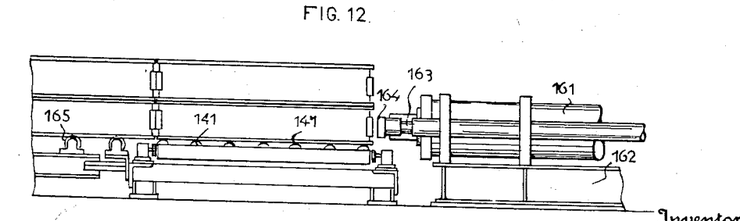
FIG. 12 shows, to a larger scale, a detail of the lower part of FIG. 11 taken on line XII—XII of FIG. 9.

A platform 116 resting on four columns 115 supports a mechanism for lowering the copes which comprises two rods 117. The rods 117 slide in two vertical guides 118 positioned in the mid-vertical plane perpendicular to the direction of arrival of the molds. The lower extremities of the sliding rods 117 are connected by a cross bar 119 which maintains them at their correct distance apart and which carries, at each of its extremities, two horizontal beams 122 perpendicular to the above mentioned plane. Each of these beams is fitted with a set of rollers 123 intended for temporarily supporting the copes by the lower faces of their upper rims. Each of the rollers 123 is mounted on a support 124 capable of pivoting around an axis 125 parallel to the corresponding beam, under the action of a hydraulic cylinder 126 of which the cylinder 127 is rigid with the cross bar and the piston rod is attached, by a connecting rod 128, to the pivoting support.

The up and down movements of the sliding rods 117 are assured by a mechanism which comprises two racks 131 rigid with the rods 117 and in mesh with toothed pinions 132 rigid with a horizontal shaft 133. The shaft 133 swivels on the platform 116 and has a toothed wheel 134 in mesh with a rack 135 rigid with the common piston rod for two hydraulic cylinders 136. The cylinders 136 are coaxial and positioned opposite one another and equally supported by the platform, each one also being fitted with a hydraulic damper at the end of its travel.

The general arrangement of the apparatus and the tracks of these different elements is such that, when the mobile rig 120 is in its upper position, the mold boxes, which rest on the plane of the upper rollers 32, can move along with the lower face of their upper edge rolling on the rollers 123. The pivoting supports 124 of these rollers then occupy the upper position in which the axes of the rollers are horizontal.

When the pivoting supports 124 are inclined as shown in FIG. 11, the space between the rollers 123 carried by the two opposite supports is then slightly more than the width of a mold box 31 so that the mobile rig of the closing station can be raised after a cope has been deposited on the corresponding drag.

The exit of the closed molds is made crosswise in the direction f3 perpendicular to the direction of entry on a horizontal plane constituted by exit rollers 141, positioned at a slightly lower level than that of the rollers 99 on the plane of arrival. Entry rollers 140 are mounted so as to either be able to be brought up to a level slightly higher than that of the rollers 99 for the entry of the molds lengthwise or to be brought down to a level slightly lower than that of rollers 141 for the exit of the molds crosswise; that is, in the direction f3 perpendicular to the direction of entry, on the exit rollers 141.

Figure 13:
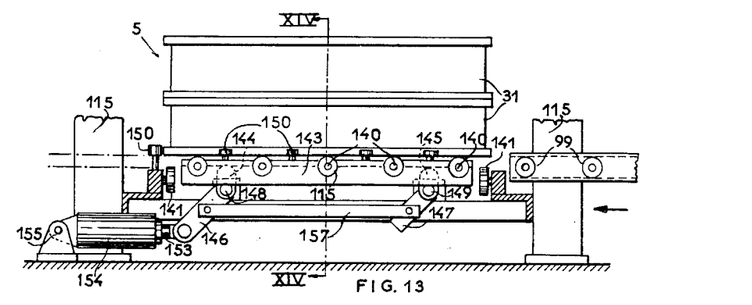
FIG. 13 is a front view, partly in section, of the station for changing direction which follows the closing station for the mold.
Figure 14:
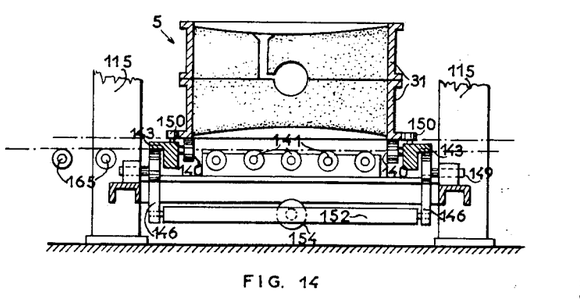
FIG. 14 is a cross sectional view taken on line XIV—XIV of FIG. 13.

To this end, in one embodiment shown diagrammatically in FIGS. 13 and 14, the rollers 140 are carried by two longitudinal parallel beams 143 each resting on two cams 144 and 145 rigid with levers 146 and 147 capable of pivoting around fixed axes 148 and 149. The free extremities of the two levers 146 are connected by a cross bar 152 to a piston rod 153 of a cylinder 154 of which the cylinder is linked to a fixed axis 155. The two levers 147 are connected respectively to the two levers 146 by coupling rods 157.

In the position shown, the piston rod 153 of the cylinder 154 is recessed in the cylinder and the cams 144 and 145 maintain the longitudinal beams 143 at their upper level in such a way that the rollers 140 are higher than the rollers 141, which is the correct position for the entry of the molds into the closing station.

On the other hand, when the piston rod of the cylinder 154 is extended out to its maximum, the cams 144 and 145 allow the longitudinal beams 143 to descend to such a height that the rollers 140 are then lower than the rollers 141 and just at the level of rollers 165 (see also FIGS. 11 and 12) on the plane of exit, which is the exit position of the molds.

The exit of the closed molds is assured (FIG. 11) by a hydraulic cylinder 161 of which the cylinder is carried by a fixed platform 162 and a piston rod 163 is fitted, at its outside extremity, with a pushing device 164. The device 164 enters into contact with the lateral faces of the drags. The molds leave by a rolling track composed of the rollers 165 which bring them to the station 5 for changing direction (FIG. 1).

The functioning of the closing station for the molds is as follows:

The drags are introduced one by one into the station under the action of the cylinder 109 (FIG. 1) which makes them leave the turning over station 3 by means of the drags being aligned on the rolling track 99 between the turning over station and the closing station.

The copes are introduced into the movable rig of the closing station under the action of the cylinder 45 of the indexing station 1 which pushes the molds through the molding machine and the turning over station. A cope and a drag are then simultaneously introduced into the closing station, one above the other, at different levels. The double cylinder 136 of the said station enters into action and it makes the cope descend, attached by the rollers 123 to the movable rig 120. This method of supporting the mold solely by its outside edges is only made possible because of the high qualities of resistance that it has due to its face being in the form of an arch. The cope becomes fitted onto the corresponding drag which rests on the rollers 140.

Under the action of the cylinders 126, the rollers 123 are retracted by being lowered and moved aside. Then the movable rig 120 ascends empty to its upper position. The set of rollers 140 on which the complete mold, formed by a cope and a corresponding drag, rests, decends under the action of the cylinder 154 by a small distance in such a way that the mold now rests on the set of rollers 141. By means of the pushing device 164, the cylinder 161 pushes the mold along the plane of exit composed of the rollers 165. This changing of direction without a bottom board is also only made possible due to the extremely resistant structure of the molds which is assured by the fact that their faces have the form of an arch.

The molds arrive at the station 5 for changing direction. The station 5 comprises a set of entry rollers 171 (FIG. 9) forming a plane of rolling in a prolongation of the rolling track formed by the rollers 165 between the closing station and the station for changing direction. A set of exit rollers 172 is orientated in a direction at right angles to that of the entry rollers 171 and movable vertically in relation thereto by means of a mechanism such as, for example, the type shown in FIGS. 13 and 14 already utilized at the closing station. This allows the molds to leave on a rolling track 173 at right angles to the rollers 165 under the action of a cylinder 174 fitted with a pushing device 175. This changing of direction can also be made without a bottom board for the above reasons.

A damping device 178 (FIG. 11) attached to a fixed frame 179 serves as a buffer for softening the shocks of the molds pushed into the station 5 for changing direction by the cylinder of the closing station for the molds. Similar dampers are, moreover, also placed anywhere in the installation where they would be useful.

Figures 16, 18:
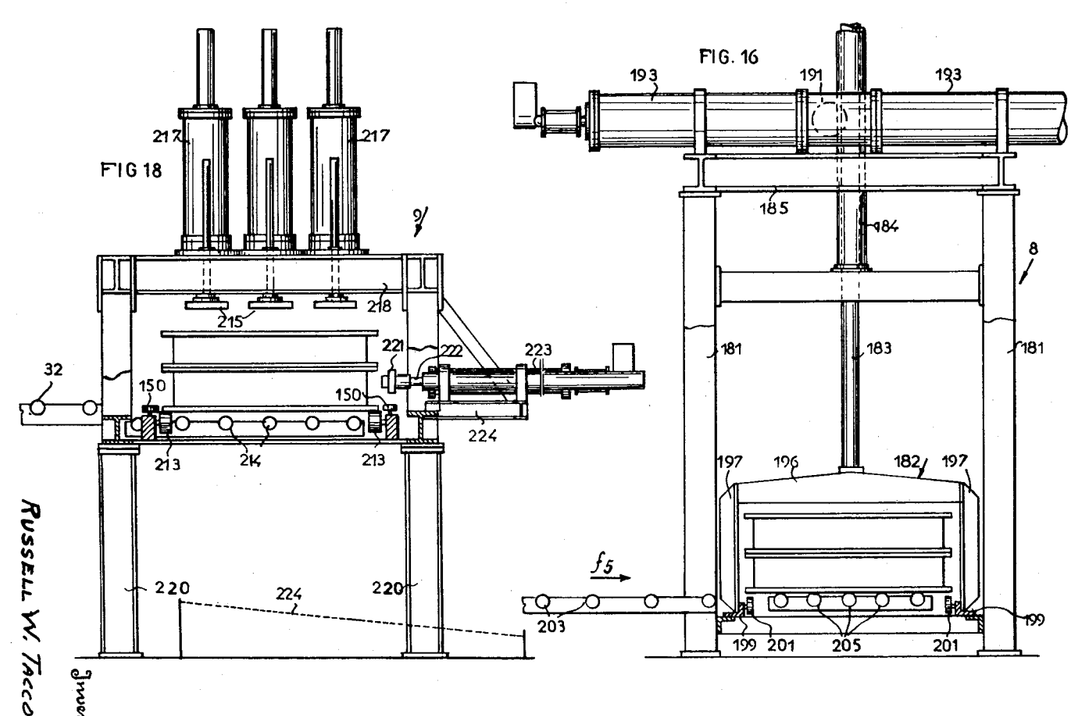
FIG. 16 is a vertical sectional view taken on line XVI—XVI of FIG. 15 of the elevating station and the punching out station.
FIG. 18 is a vertical sectional view taken on line XVIII—XVIII of FIG. 15 of the station for punching out the molds.

In addition, in order to properly maintain the mold boxes laterally even though the rollers are normally fitted with flanges, lateral rollers are provided, particularly at the stations for changing direction, at 150 as shown in FIGS. 13, 14, and 18, for example. The rollers have their axes vertical and the corresponding edges of the mold boxes 31 bear thereagainst.

The molds which are pushed one after the other by the cylinder 174 then pass to the station 6 for pouring the molten metal into the mold. The station 6 is an automatic station which is shown diagrammatically. A simple ladle 176 is fitted with a spout for pouring of any suitable conventional type indicated at 177, in which the opening is actuated automatically. Due to the very resistant arched shape of the structure of the molds, it is not necessary to place them on bottom boards either when filling them or when they are being submitted to the hardening treatment. They roll afterwards to the cooling area 7 and arrive at the elevating station 8.

The elevation station of the molds (FIGS. 15, 16, and 17) comprises four columns 181 supporting a rig assembly 182 vertically movable and carried by the lower extremities of two rods 183. The rods 183 can slide in vertical tubular guides 184 supported by a platform 185 fixed onto the upper extremities of the columns. The two sliding rods 183 are rigid with racks 186 in mesh, respectively, with two pinions 187 rigid with a shaft 188. The shaft 188 has a toothed wheel 191 in mesh with a rack 192 rigid with the common piston rod of two hydraulic cylinders 193. The cylinders are positioned coaxially opposite each other on the platform 185.

Figure 15:
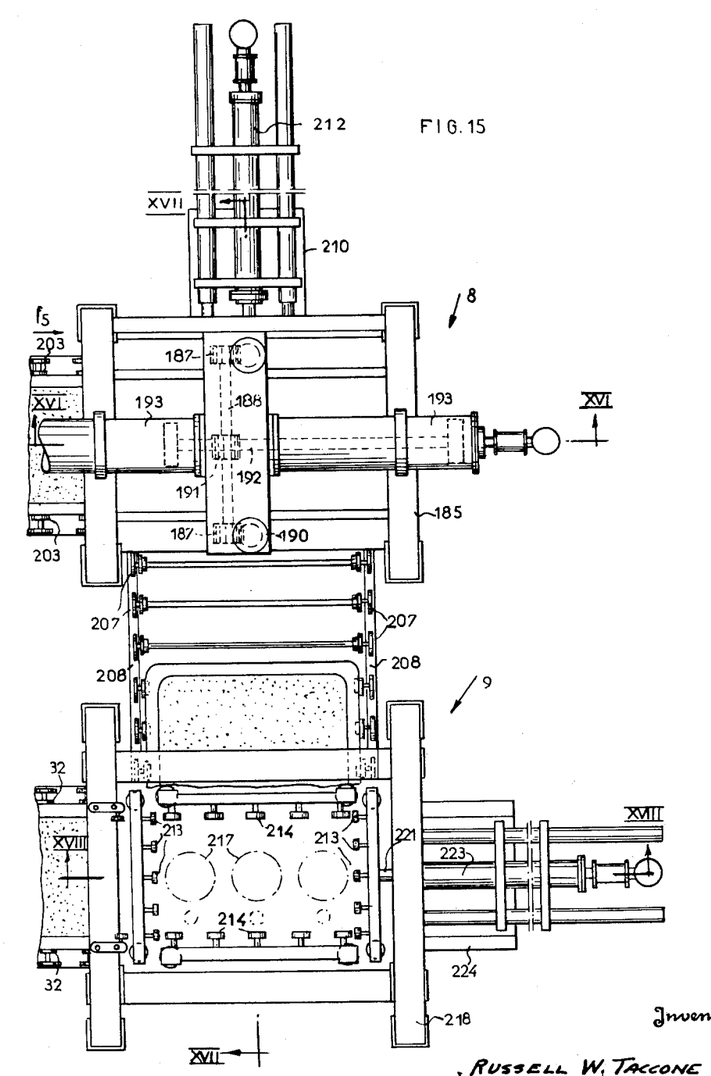
FIG. 15 is a plan view of a station for raising of the molds after casting and, also, the punching out station.

The mobile rig 182 comprises two upper horizontal cross bars 196 parallel to the direction of entry of the molds and fixed to the lower extremities of the two sliding rods 183. The molds enter into the elevating device lengthwise in the direction of the arrow f5 (FIGS. 15 and 16).

An upright 197 is attached at each extremity of each of the two cross bars 196 in such a way that each cross bar and its two uprights form an assembly in the shape of a cover of which the legs are pointing downwardly.

Figure 17:
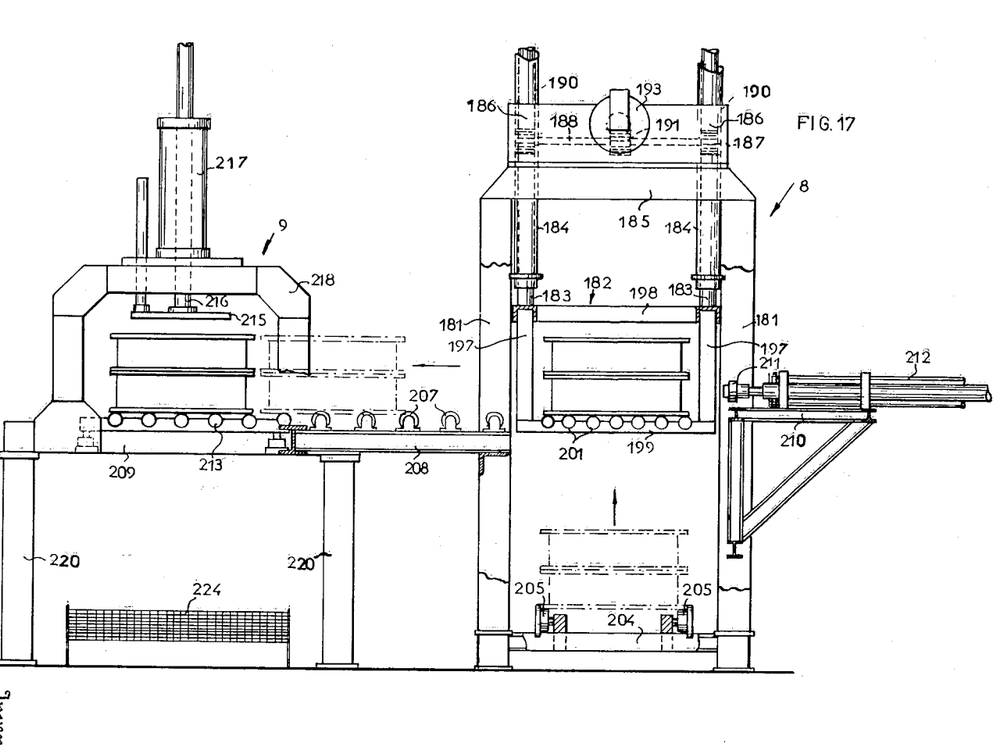
FIG. 17 is a cross sectional view taken on line XVII—XVII of FIG. 15.

Two bracing bars 198 connect the corresponding extremities of the two cross bars and two other bars constituted by angle bars 199 connect the extremities of the corresponding legs of two covers. Each angle bar 199 carries a row of rollers 201 for the exit of the molds. The dimensions of the covers are such that the molds can traverse them crosswise (FIG. 16) and their spacing is such that the molds can pass, lengthwise, between them (FIG. 17).

Below the elevating station at the level where the molds arrive and in the direction of the arrow f5, a platform 204 is provided on a rolling track 203 and is fitted with rolling wheels 205 on which the molds arrive. When the movable rig 182 is at the end of its lower course, its lower bars 199 rest on the platform 204 and its rollers 201 are at a slightly lower level than the wheels 205 of the entry platform. When the movable rig is at the end of its upper travel, the rollers 201 which are carried by it are then at the level of the exit plane of the elevating device, constituted by a series of rollers 207 carried by two beams 208. The molds are expelled from the movable rig crosswise on the plane of exit by a pushing device 211 of a hydraulic cylinder 212 fixed onto a support 210 and rigid with the columns 181.

The functioning of the elevating device is as follows:

Each mold arrives lengthwise on the fixed lower plane of the wheels 205 at the interior of the movable rig 182 previously brought to its lower position. The sand in the mold does not collapse due to the solidity of the arch. The movable rig, which is then raised to its upper position under the action of the cylinders 193, raises up the mold by its rollers 201. Finally, the cylinder 212 drives the molds from the movable rig crosswise and then they pass onto the plane of exit which leads them to the punching out station 9.

The punching out station 9 for the molds (FIGS. 15, 17, and 18) comprises a platform 209 supported by columns 220. The columns 220 comprise two parallel rows of rollers 213 for the arrival of the molds, crosswise, at the level of the plane of exit from the elevating device and two other parallel rows of rollers 214 for engaging the direction of the molds by right angles for the exit of the empty mold boxes lengthwise. The exit rollers 214 which are at a lower level than the entry rollers 213 at the moment when the molds come into the punching out station are brought up to a slightly higher level for the exit of the mold boxes. This is done by means of a device of the type described with reference to FIGS. 13 and 14 and already used at the closing station 4 for the molds and at the station 5 for changing direction.

The punching out is assured by one or more plates or disks 215 each carried by a piston rod 216 of a cylinder 217 supported by a frame 218 fixed onto the upper part of the columns 220.

Each mold is pushed to the punching out station by the following molds which are themselves pushed by the cylinder 212 from the exit of the elevating station. The mold boxes, emptied of their sand and the castings at the punching out station, are sent out from the said station by means of a pushing device 221 fixed to a pison rod 222 of a cylinder 223 fixed onto a structure 224 integral with the columns 220.

The sand and the castings fall between the columns 220 below the plane of support for the molds onto a grid or screen 224 (see also FIG. 1) from where they are evacuated by means of any convenient classical device. Until they arrive at the punching out station, as from the time they leave the molding station, the molds do not suffer any damage or deformation due to the fact that the shape of their surface is in the form of an arch, despite the numerous changes of direction and level, and the shock and vibrations to which they have been submitted.

Figure 19:
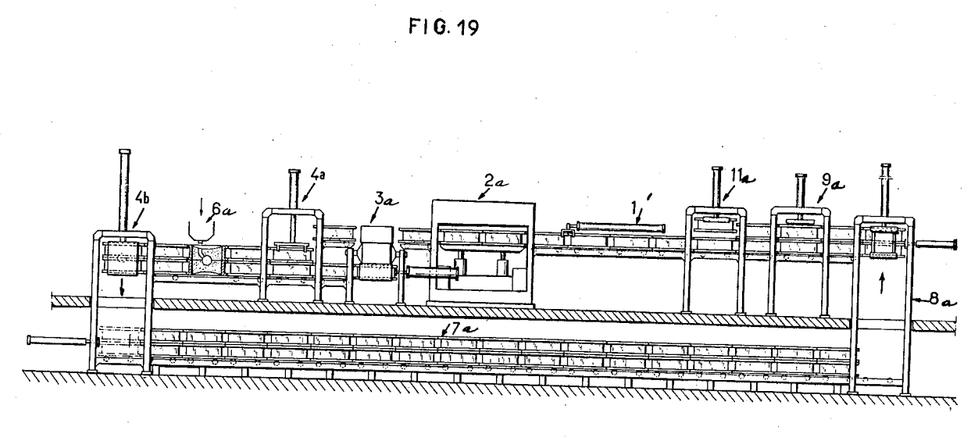
FIG. 19 diagrammatically shows a modification of the installation of FIG. 1.

In the modification illustrated in FIG. 19, the rectangular circuit of the boxes and molds, instead of being located substantially in a horizontal plane as in the embodiment of FIGS. 1 to 18, is located substantially in a vertical plane; however, the operation thereof is similar. In the installation of FIG. 19, the various stations are provided along a long horizontal side of the rectangular circuit. These stations are an indexing station 1' for bringing the mold boxes, two by two, into a molding machine 2a and for withdrawing the molds from the machine 2a. A station 3a turn over the drags and, at the same time, serves as a means of bringing them to a lower level than the copes which follow their path at their level of leaving the molding machine. A closing station 4a is provided for the molds, a station 6a for pouring metal into the molds, and a station 4b for changing the action by a right angle wherein the molds are let down along a short vertical side of the rectangular circuit. A cooling area 7a is constituted in this embodiment by the whole length of the second long side of the rectangular circuit located under the former long aforesaid side and then forming the second short side of the rectangle. A station 8a is provided for bringing the molds to a higher level and, at the entrance to the long former long horizontal side of the circuit, a station 9a is provided for the punching out of the molds and a station 11a for taking hold of each cope again in order to replace it just behind the drag on which it had been previously positioned.

It will be noted that every active operation is affected on the upper long side of the rectangular circuit while the lower long side constitutes only the cooling area, and both short sides serve only for bringing the molds to a lower level and to their upper level, respectively.

The foregoing specification sets forth the invention in its preferred practical forms but the structure shown is capable of modification within a range of equivalents without departing from the invention which is to be understood is broadly novel as is commensurate with the appended claims.

I claim:

1. An automatic installation comprising
a top and a bottom track,
said bottom track being disposed directly below a part of said top track,
said top track and said bottom track each extending approximately half way around a molding machine,
index means on said top track for moving flasks in ordered sequence to said molding machine,
a roll over device,
a closing means on said tracks,
a pouring station on said bottom track,
a punch out station on said bottom track,
said flasks being made up of a cope section and a drag section,
means moving said flasks one ahead of the other intermittently on said tracks,
said molding machine being supported adjacent said top track with a means below said flasks and said top track to support sand in said flasks resting on said top track,
a molding head above said top track to compress sand in said flasks above said sand support means,
said roll over device being along said top track on the same side thereof with said molding machine,
means on said machine for moving each said drag section down from the level of said top track to a position under said cope sections and for rolling said drag sections over,
said closing means having means thereon for moving said drag sections relative to said cope sections and into engagement therewith and for closing them together,
said pouring station being on said bottom track with means thereon for stopping said flasks to receive molten metal from a pouring device,
said bottom track functioning to carry said flasks while the molten metal cools,
means at one end of said top track to move completed molds to said bottom track,
and means at the other end of said top track for moving flasks from said bottom track to said top track, 2. The installation recited in claim 1 wherein
said index means move said flasks along said top and bottom tracks and keep said flasks moving at each corner of said tracks to change the direction of movement thereof.

References Cited in the file of this patent
UNITED STATES PATENTS

| | | |
|---|---|---|
| 997,306 | Maclean | July 11, 1911 |
| 2,904,858 | Pinchon | Sept. 22, 1959 |